United States Patent
Anderson (10) Patent No.: US 8,042,039 B2
(45) Date of Patent: Oct. 18, 2011

(54) POPULATING A DYNAMIC PAGE TEMPLATE WITH DIGITAL CONTENT OBJECTS ACCORDING TO CONSTRAINTS SPECIFIED IN THE DYNAMIC PAGE TEMPLATE

(75) Inventor: Dean A. Anderson, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 553 days.

(21) Appl. No.: 12/253,150

(22) Filed: Oct. 16, 2008

(65) Prior Publication Data

US 2009/0292986 A1    Nov. 26, 2009

Related U.S. Application Data (60) Provisional application No. 61/056,009, filed on May 25, 2008.

(51) Int. Cl.
*G06F 17/00* (2006.01)
(52) U.S. Cl. .................. 715/246; 715/243; 715/253
(58) Field of Classification Search .................. 715/243, 715/246, 253
See application file for complete search history.

(56) References Cited

U.S. PATENT DOCUMENTS

| | | | |
|---|---|---|---|
| 6,636,648 B2 | 10/2003 | Loui et al. | |
| 6,636,650 B1 * | 10/2003 | Long et al. | 382/295 |
| 6,826,727 B1 | 11/2004 | Mohr et al. | |
| 6,931,591 B1 | 8/2005 | Brown et al. | |
| 7,046,849 B2 | 5/2006 | Nagaishi | |
| 7,092,966 B2 * | 8/2006 | McIntyre | 1/1 |
| 7,188,310 B2 | 3/2007 | Schwartzkopf | |
| 7,240,294 B2 * | 7/2007 | Fitzsimons et al. | 715/788 |
| 7,296,224 B2 | 11/2007 | Atkins et al. | |
| 7,308,650 B2 | 12/2007 | Yamakado et al. | |
| 7,340,676 B2 | 3/2008 | Geigel et al. | |
| 7,380,212 B2 * | 5/2008 | Cody et al. | 715/752 |
| 2002/0040375 A1 * | 4/2002 | Simon et al. | 707/517 |
| 2002/0095439 A1 * | 7/2002 | Long et al. | 707/507 |
| 2003/0137545 A1 * | 7/2003 | Hoehn et al. | 345/838 |
| 2005/0111737 A1 | 5/2005 | Das et al. | |
| 2006/0109516 A1 | 5/2006 | Catalan et al. | |
| 2006/0109517 A1 | 5/2006 | Catalan | |
| 2006/0184876 A1 * | 8/2006 | Ota et al. | 715/517 |
| 2006/0190811 A1 * | 8/2006 | Ohno | 715/507 |
| 2006/0279566 A1 * | 12/2006 | Atkins et al. | 345/418 |
| 2007/0019924 A1 | 1/2007 | Teo et al. | |
| 2008/0065634 A1 * | 3/2008 | Krinsky | 707/6 |
| 2008/0304718 A1 * | 12/2008 | Ryuto et al. | 382/118 |
| 2009/0327954 A1 * | 12/2009 | Danton et al. | 715/810 |

* cited by examiner

*Primary Examiner* — Doug Hutton, Jr.
*Assistant Examiner* — Scott M Kelly (57) ABSTRACT

A dynamic page template is populated with one or more digital content objects, comprising. For each digital content object, a locus is determined in relation to the dynamic page template. The locus specifies locations on the dynamic page template at which the digital content object can be placed. The digital content object is then placed on the dynamic page template at one of the locations specified by the locus. The digital content objects placed on the dynamic page template are algorithmically manipulated one or more times to change sizes and/or locations of one or more of the digital content objects. The dynamic page template is then output.

15 Claims, 7 Drawing Sheets

POPULATING A DYNAMIC PAGE TEMPLATE WITH DIGITAL CONTENT OBJECTS ACCORDING TO CONSTRAINTS SPECIFIED IN THE DYNAMIC PAGE TEMPLATE

CROSS REFERENCE TO RELATED APPLICATIONS

This Application claims the benefit of provisional patent application Ser. No. 61/056,009, filed May 25, 2008 titled "POPULATING DYNAMIC PAGE TEMPLATE WITH DIGITAL CONTENT OBJECTS" which application is incorporated by reference herein as if reproduced in full below.

BACKGROUND

Taking digital pictures with a digital camera, and subsequently manipulating them using a computing device, has proven to be a popular activity with users. One type of application involves selecting a number of digital pictures for inclusion on a page template. A page template typically defines a background, and in the prior art, usually specifies a static number of positions at which digital pictures or other types of digital content objects, such as text or clipart, can be placed. After population of the digital page template with digital images, a user may print out the resulting page to share. A number of such pages populated with digital pictures may be printed in book form, for instance, to provide a user with a unique and custom product by which to share his or her digital pictures.

A difficulty with existing page templates is that they are typically static. That is, a given page template usually statically defines the number of digital pictures that can be placed on the page, as well as their locations and/or sizes. To provide users with a rich ability to place different numbers of photos at different locations and with different sizes on a given page, a page template designer may therefore have to create hundreds, if not more, of different page templates. Even then, users may still want to place their digital pictures in a way that is not provided by any of these different page templates. Thus, current approaches for existing page templates result in the page template designer having to engage in often tedious work to create large numbers of page templates, while potentially still not satisfying the expectations and needs of users.

DETAILED DESCRIPTION OF THE DRAWINGS

Figure 1:
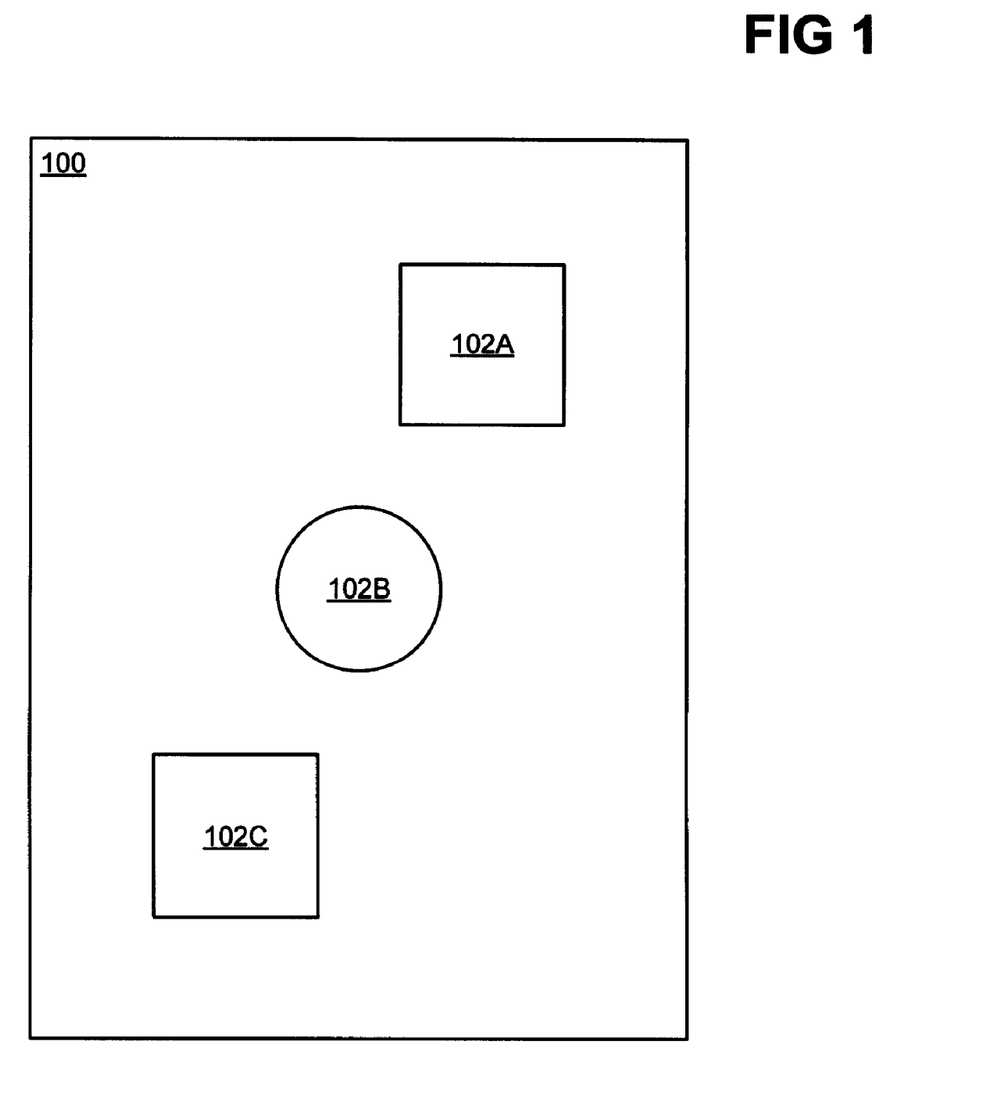
FIG. 1 is a diagram of a rudimentary dynamic page template on which a number of digital content objects have been placed, according to an embodiment of the present disclosure.

FIG. 1 shows a rudimentary dynamic page template 100, according to an embodiment of the present disclosure. The dynamic page template 100 is a digital file that represents a page that can be displayed on a display device like a computer monitor, or printed on a media sheet such as paper by a printing device, such as an inkjet-printing device or a laser-printing device. The dynamic page template 100 is a template in that it defines how digital content objects are to be placed onto the page in question. The dynamic page template 100 may further specify background text and/or images that are statically located on the page in question prior to the placement of the digital content objects thereon.

For example, in FIG. 1, three digital content objects 102A, 102B, and 102C, collectively referred to as the digital content objects 102, have been placed on the dynamic page template 100. The digital content objects can be digital images, text, and other types of digital content objects. The dynamic page template 100 is dynamic in that it does not a priori specify or constrain the number of digital content objects, and/or their sizes and shapes when placed on the page. This will become more apparent later in the detailed description. It is noted that this aspect of at least some embodiments of the present disclosure is different than in the prior art, where static page templates within the prior art do a priori specify or constrain the number, sizes, and/or shapes of digital content objects placed on the page.

Figure 2:
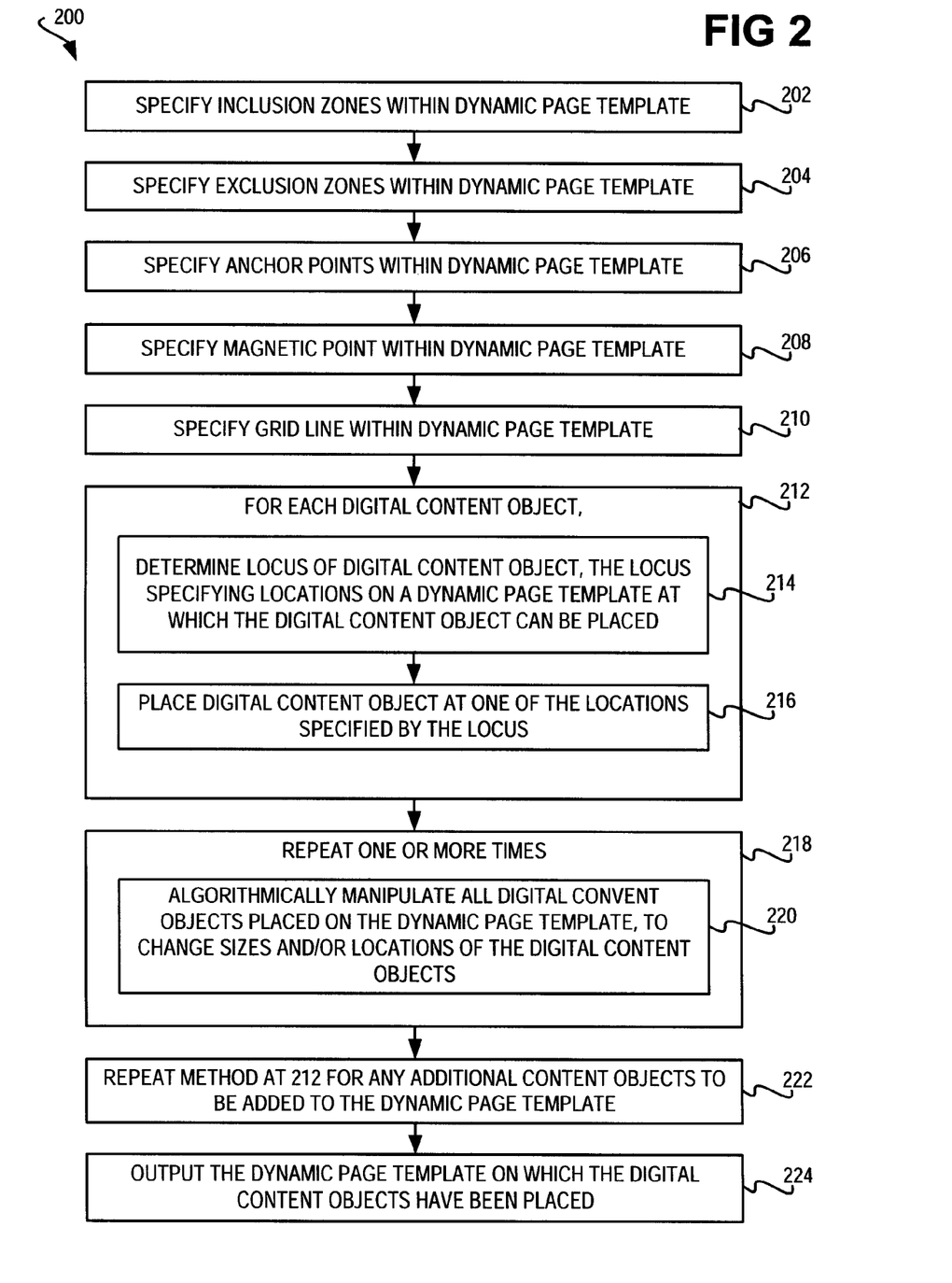
FIG. 2 is a flowchart of a method, according to an embodiment of the present disclosure.

FIG. 2 shows a method 200, according to an embodiment of the present disclosure. The method 200 can be implemented as one or more computer programs stored on computer-readable medium. A computer-readable medium is a non-transitory medium. Examples of computer-readable media include recordable data storage media, such as optical, magnetic, and/or semiconductor media. The computer programs may be executed by one or more processors of a computing device, such as, but not limited to, a desktop or a laptop computer.

The method 200 is generally for populating a dynamic page template with one or more digital content objects. It is noted that the various parts of the method 200 are described in relation to FIG. 2 as being performed in a particular order. However, those of ordinary skill within the art can appreciate that this is for exemplary purposes only, and other embodiments of the present disclosure can and will deviate from the specific order specified in FIG. 2.

The method 200 can specify one or more inclusion zones within the dynamic page template in question (202), as well as one or more exclusion zones within the dynamic page template (204). An inclusion zone can be defined as a positive specification of a contiguous demarcation of locations within the dynamic page template in which digital content objects can be placed. By comparison, an exclusion zone can be defined as a positive specification of a contiguous demarcation of locations within the dynamic page template in which the digital content objects are not to be placed.

Thus, specification of inclusion zones inherently specifies exclusion zones, insofar as specifying where digital content objects can be placed implicitly specifies where digital content objects are not to be placed. Likewise, specification of exclusion zones inherently specifies inclusion zones, insofar as specifying where digital content objects are not to be placed implicitly specifies where digital content objects can be placed, assuming there is an inclusion zone that represents the page boundary. An exclusion zone may, for instance, track a static background image or text that has been placed on the dynamic page template, so that the digital content objects do not cover or overlap the static image or text when they are dynamically placed on the page.

Figure 3:
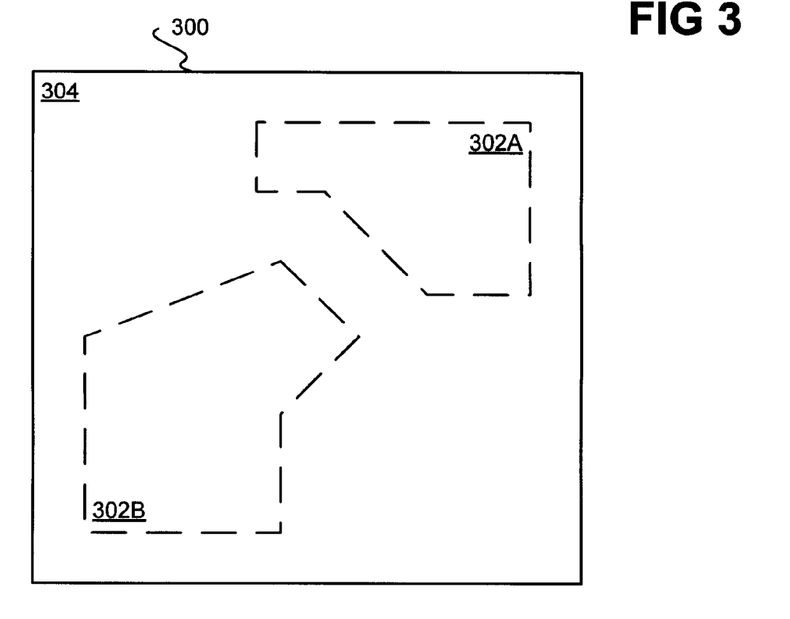
FIG. 3 is a diagram depicting a dynamic page template having inclusion and/or exclusion zones, according to an embodiment of the present disclosure.

FIG. 3 shows a representative dynamic page template 300 having specified zones 302A and 302B, collectively referred to as the zones 302, according to an embodiment of the present disclosure. If the zones 302 are inclusion zones, then this means that all digital content objects have to be placed within the zones 302, and cannot be placed at any of the locations outside the zones 302, where such locations are denoted by reference number 304 in FIG. 3. Similarly, if the zones 302 are exclusion zones, then this means that none of the digital content objects can be placed within the zones 302, and have to be placed at the locations outside the zones 302, where again such locations are denoted by reference number 304 in FIG. 3.

Referring back to FIG. 2, the method 200 can specify one or more anchor points within the dynamic page template (206), one or more magnetic points within the dynamic page template (208), and one or more grid lines within the dynamic page template (210). Anchor points denote where digital content objects are to be placed on the dynamic page template, by specifying points within the dynamic page template at which the digital content objects are placed on the page. Anchor points can anchor corners, edges, or the center of the digital content objects. A magnetic point specifies a point within the dynamic page template around which the digital content objects are clustered when placed on the page. A grid line specifies a line within the dynamic page template along which the digital content objects are placed on the page. The terminology "grid line" is used in a general and all-encompassing sense, and can include lines that have one or more changes in direction, curved lines, and so on, and not just straight lines as per the strict mathematical definition of what a line is. There may be one or more magnetic points and/or one or more grid lines.

Figure 4:
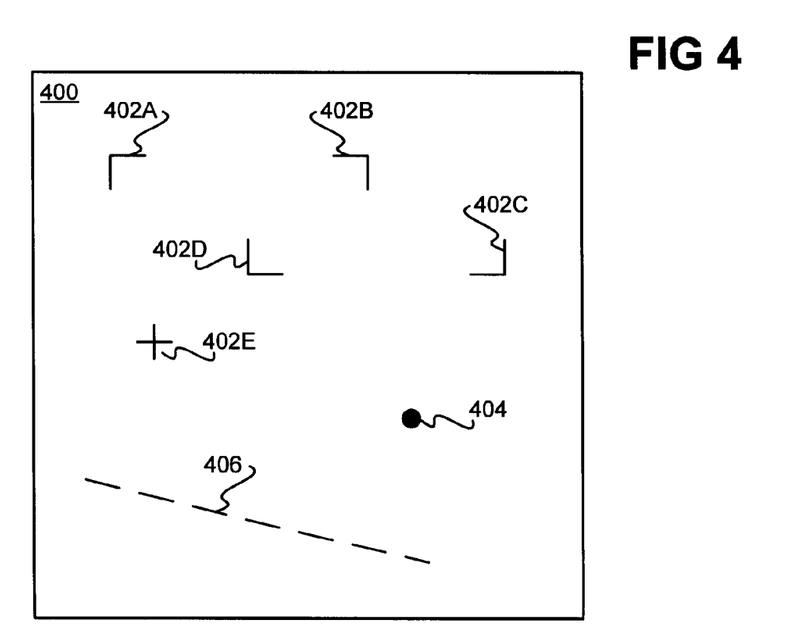
FIG. 4 is a diagram depicting a dynamic page template having anchor points, a magnetic point, and a grid line, according to an embodiment of the present disclosure.

FIG. 4 shows a representative dynamic page template 400 having specified anchor points 402, a magnetic point 404, and a grid line 406, according to an embodiment of the present disclosure. The anchor points 402 include anchor points 402A, 402B, 402C, 402D, and 402E. The anchor point 402A specifies the location at which a digital content object is to be placed on the page by particularly specifying the location where the upper left-hand corner of such an object is to be placed on the page. Similarly, the anchor points 402B, 402C, and 402D specify the locations at which digital content objects are to be placed on the page by particularly specifying the locations where the upper right-hand corner, the lower right-hand corner, and the lower-left hand corner, respectively, of such objects are to be placed on the page.

By comparison, the anchor point 402E specifies the location at which a digital content object is to be placed on the page by particularly specifying the location where the center of such an object is to be placed on the page. The magnetic point 404 specifies the location on the page around which digital content objects are clustered when placed on the page, such as in a non-overlapping manner. The grid line 406 specifies a line of locations on the page along which digital content objects are placed on the page, such as where the centers of such objects are to be placed on the page.

It is noted that if just the anchor points 402 are specified by the dynamic page template, and not the magnetic point 404 and the grid line 406, then the first five digital content objects placed on the dynamic page template are successively placed at locations specified by the anchor points 402 until all the anchor points have been used. The order in which the anchor points 402 are used may be the order in which the anchor points 402 were originally specified. Once all the anchor points 402 have been used, any subsequent digital content objects are placed on the page in a different way, such as in a way as described later in the detailed description.

It is noted that if just the magnetic point 404 is specified by the dynamic page template, and not the anchor points 402 and the grid line 406, then all the digital content objects placed on the dynamic page template may be successively placed at locations clustering around the magnetic point 404. For example, the first few digital content objects may be placed as close as possible to the magnetic point 404, the next few digital content objects may be placed a little farther away from the magnetic point 404 such that they are close to the magnetic point 404 but do not overlap the initially placed digital content objects, and so on. The magnetic point 404 may also specify the number of digital content objects that are to be clustered around the point 404. Once this number of digital content objects has been so placed on the page, any subsequent digital content objects are placed on the page in a different way, such as in a way as described later in the detailed description.

It is noted if just the grid line 406 is specified by the dynamic page template, and not the anchor points 402 and the magnetic point 404, then all the digital content objects placed on the dynamic page template may be successively placed along the grid line 406. For example, the digital content objects may be placed along the grid line 406 from left to right, from right to left, or in another manner. The grid line 406 may also specify the number of digital content objects that are to be placed along the line 406. Once this number of digital content objects has been so placed on the page, any subsequent digital content objects are placed on the page in a different way, such as in a way as described later in the detailed description.

If two or more of the anchor points 402, the magnetic point 404, and the grid line 406 are specified by the dynamic page template, then the template may specify the order in which the points 402 and 404 and the line 406 are to be used, and how many digital content objects are to use each of the magnetic point 404 and the grid line 406. For example, if all the anchor points 402, the magnetic point 404, and the grid line 406 are present, then the dynamic page template may specify that each successive group of three digital content objects be placed on the page as follows. The first object of a group may be placed at one of the anchor points 402, the second object of the group may be clustered around the magnetic point 404, and the third object may be placed along the grid line 406. Those of ordinary skill within the art can appreciate that the dynamic page template may specify how the anchor points 402, the magnetic point 404, and the grid line 406 are to be used in a different way as well.

Referring back to FIG. 2, the method 200 performs the following for each of one or more digital content objects (212). First, a locus of the digital content object is determined (214). The locus specifies locations on the dynamic page template at which the digital content object can be placed. The locus is determined by taking into account any inclusion zones and/or exclusion zones that have been specified. Furthermore, the locus can be determined so that the digital content object cannot be placed on the dynamic page template such that the object overlaps any digital content objects that have already been placed on the dynamic page template. It is noted that the size, shape, and/or number of the digital content objects is not limited by embodiments of the present disclosure. Thus, a user may place any number, of any size or of any shape, of digital content objects on the dynamic page template.

Figure 5:
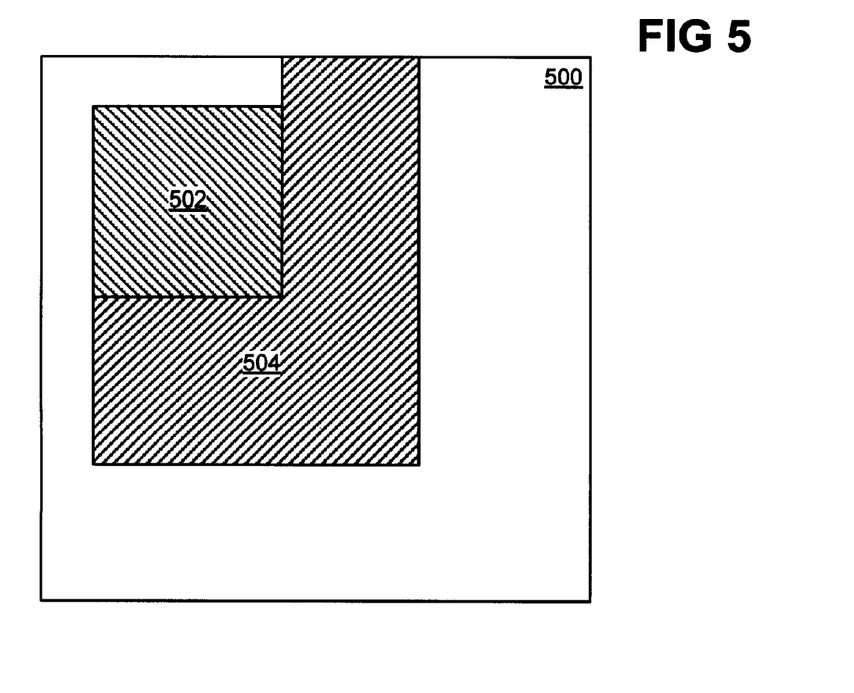
FIG. 5 is a diagram of a representative dynamic page template in which a locus for a digital content object to be placed on the page is depicted, according to an embodiment of the present disclosure.

FIG. 5 shows a representative dynamic page template 500 on which a digital content object 502 has already been placed, according to an embodiment of the present disclosure. Another digital content object having the same size as the digital content object 502 is to be placed on the dynamic page template 500. A locus 504 is determined. The locus 504 specifies the locations at which the additional digital content object can be placed on the dynamic page template 500.

Particularly, the locus 504 specifies all the locations at which the upper-left hand corner of the additional digital content object can be placed on the dynamic page template 500. It is noted that the locus 504 is such that when the additional digital content object is placed on the dynamic page template 500 such that the upper left-hand corner of this object is within the locus 504, two constraints are satisfied. The first constraint is that the already placed digital content object 502 is not overlapped. The second constraint is that the additional digital content object fits on the dynamic page template 500 in its entirety.

Referring back to FIG. 2, the method 200 then places the digital content object in question at one of the locations specified by the locus that has been determined for this object (216). The specific location, of the locations specified by the locus, at which the digital content object is placed on the dynamic page template is particularly determined based on constraints specified by the template itself. For instance, if any anchor points have been specified within the dynamic page template, then digital content objects may be successively placed at these anchor points until they have all been used. As another example, if a magnetic point has been specified within the dynamic page template, then digital content objects may be successively clustered around the magnetic point. If a grid line has been specified within the dynamic page template, then digital content objects may be successively placed along the grid line.

As has been described above, once all the anchor points have been used, and/or a predetermined number of digital content objects have been clustered around the magnetic points, and/or a predetermined number of digital content objects have been placed along a grid line, any remaining unplaced digital content objects may be placed on the dynamic page template in a different way. Such a way may also be followed where no anchor points, no magnetic point, and no grid line has been specified. One such way is to place the digital content objects on the dynamic page template in accordance with a predetermined direction and a predetermined orientation.

Figure 6:
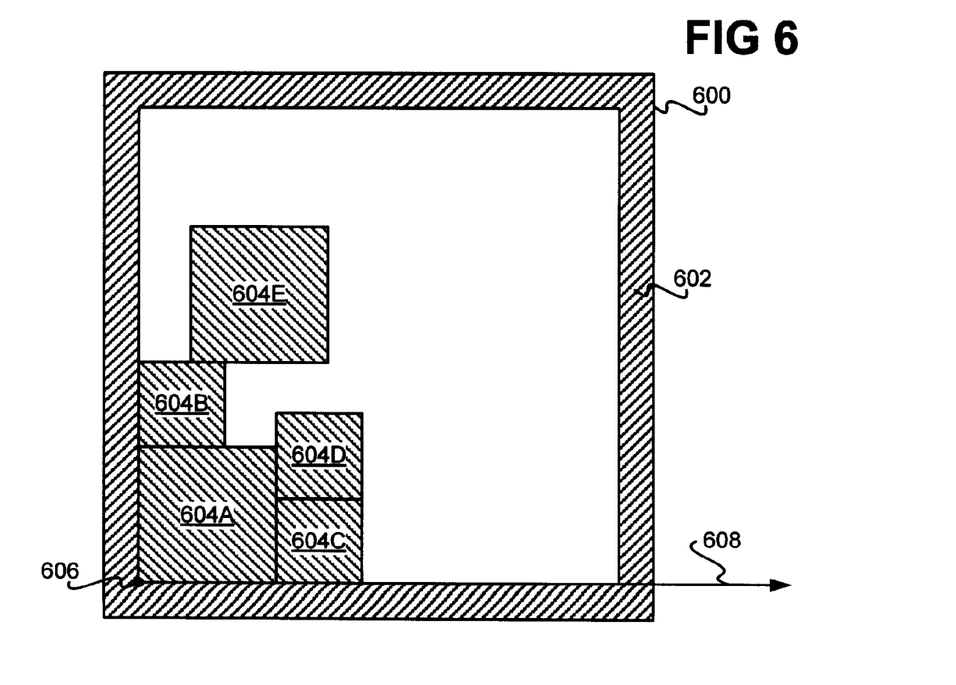
FIG. 6 is a diagram of a representative dynamic page template in which digital content objects are placed on the page in accordance with a predetermined direction and a predetermined orientation, according to an embodiment of the present disclosure.

FIG. 6 shows a representative dynamic page template 600 having an exclusion zone 602 and a number of digital content objects 604 that have been placed on the page in accordance with a predetermined direction and a predetermined orientation, according to an embodiment of the present disclosure. The digital content objects 604 include the objects 604A, 604B, 604C, 604D, and 604E, which have been placed on the dynamic page template 600 in that order. In the example of FIG. 6, the digital content objects 604 have been placed in a counter-clockwise direction, starting from a 45-degree orientation from an origin point 606 of the dynamic page template, where the origin point 606 is at the lower left-hand corner of the dynamic page template, and a zero-degree line 608 is a horizontal line extending left to right from the origin point.

Thus, the digital content object 604A is placed first in the lower-left hand corner of the dynamic page template 600, taking into account the exclusion zone 602 and the 45-degree orientation denoted in the previous paragraph. The next digital content object 604B is placed by sweeping an imaginary line corresponding to this 45-degree orientation counter-clockwise, such that it is placed above the digital content object 604A. The next digital content object 604C is placed by sweeping the imaginary line counter-clockwise completely around the origin point 606 until it reaches the zero-degree line 608, such that the digital content object 604C is placed to the right of the digital content object 604A.

The next digital content object 604D is placed by again sweeping the imaginary line counter-clockwise, until it reaches a point to the upper-right of the digital content object 604A and above the digital content object 604C where the object 604D can be placed. The final digital content object 604E is placed also by sweeping the imaginary line counter-clockwise, until it reaches a point above the digital content object 604B where the object 604E can be placed. Any subsequently placed digital content objects are also placed by following this process.

Referring back to FIG. 2, once parts 214 and 216 have been successively performed for each digital content object in question (212), the following can be repeated one or more times (218). In particular, all the digital content objects that have been placed on the dynamic page template are algorithmically manipulated (one or more times), to change their sizes and/or locations on the dynamic page template (220). Such algorithmic manipulation can be mandated by a predetermined script specified by the dynamic page template itself. The nature of the algorithmic manipulation is not limited by embodiments of the present disclosure. In general, the manipulation is achieved by executing a predetermined script that defines an algorithm that changes the sizes and/or the locations of the digital content objects that have already been placed on the dynamic page template.

Figure 7A:
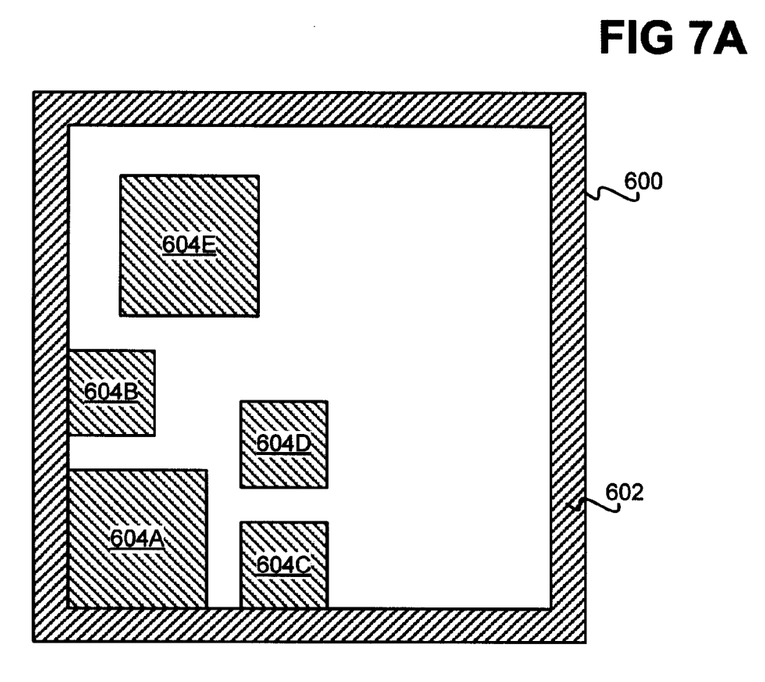
FIGS. 7A and 7B are diagrams depicting the dynamic page template of FIG. 6 after a first iteration and a second iteration, respectively, of algorithmic manipulation to particularly change the locations of the digital content objects placed on the page, according to an embodiment of the present disclosure.
Figure 7B:
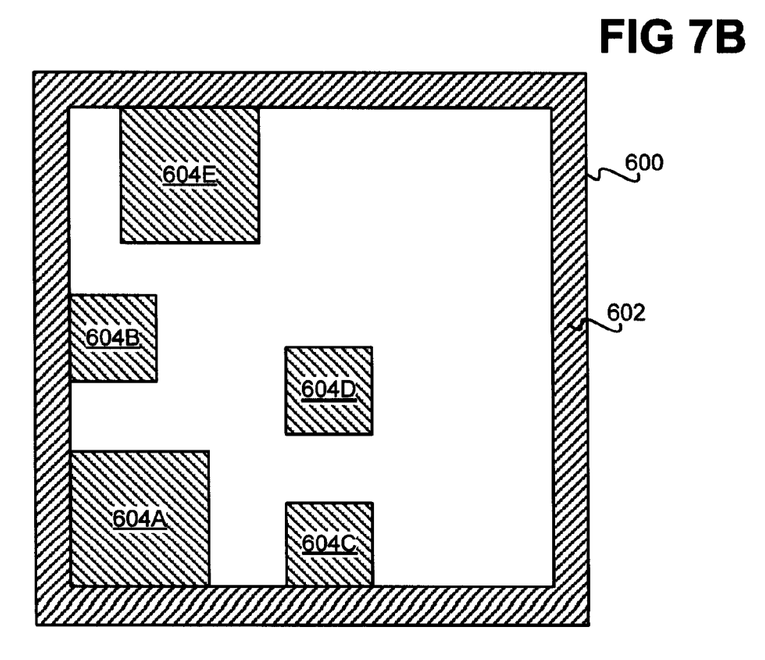

FIGS. 7A and 7B show the representative dynamic page template 600 of FIG. 6 having the exclusion zone 602 and the digital content objects 604 placed thereon after two iterations of an algorithmic manipulation, according to an embodiment of the present disclosure. The algorithmic manipulation is to separate the digital content objects 604B, 604C, 604D, and 604E (i.e., all the digital content objects 604 except for the first digital content object 604A placed on the dynamic page template) from the first-placed digital content object 604A by a predefined distance. FIG. 7A shows the results in so changing the locations of the digital content objects 604 after a first iteration of this algorithmic manipulation, in which the digital content objects 604B, 604C, 604D, and 604E are located farther away from the digital content object 604A as compared their placement in FIG. 6. FIG. 7B shows the results in so changing the locations of the digital content objects 604 after a second iteration of this algorithmic manipulation, in which the digital content objects 604B, 604C, 604D, and 604E are located even farther away from the digital content object 604A as compared to their placement in FIGS. 6 and 7A.

Referring back to FIG. 2, once part 220 has been repeated one or more times (218), the method 200 can be repeated at part 212 for any additional content objects to be added to the dynamic page template (222). It is noted that inclusion of part 222 of the method 200 provides for the following. For example, there may be two groups of digital content objects. Once parts 202, 204, 206, 208, and 210 of the method 200 have been performed, the digital content objects of the first group have their loci determined and are placed on the dynamic page template in part 212. Thereafter, the digital content objects of the first group are algorithmically manipulated one or more times in part 218. After that, the digital content objects of the second group have their loci determined and are placed on the dynamic page template in part 212, and the digital content objects of both the first and the second groups are algorithmically manipulated one or more times in part 218.

Thus, repeating the method 200 at part 212 as achieved by part 222 permits a number of first digital content objects to be placed on the dynamic page template prior to algorithmic manipulation in part 218, and then permits a number of second digital content objects to be thereafter placed on the page after the algorithmic manipulation of the first digital content objects has been performed. Once all the digital content objects have been placed on the dynamic page template, the method 200 proceeds to output the dynamic page template as has been populated with these objects (224). In one embodiment, such output can include printing the dynamic page template on which all the digital content objects have been placed, using a printing device. In another embodiment, such output can include displaying the dynamic page template on which all the digital content objects have been placed, on a display to which the computing device performing the method 200 is communicatively connected.

Figure 8:
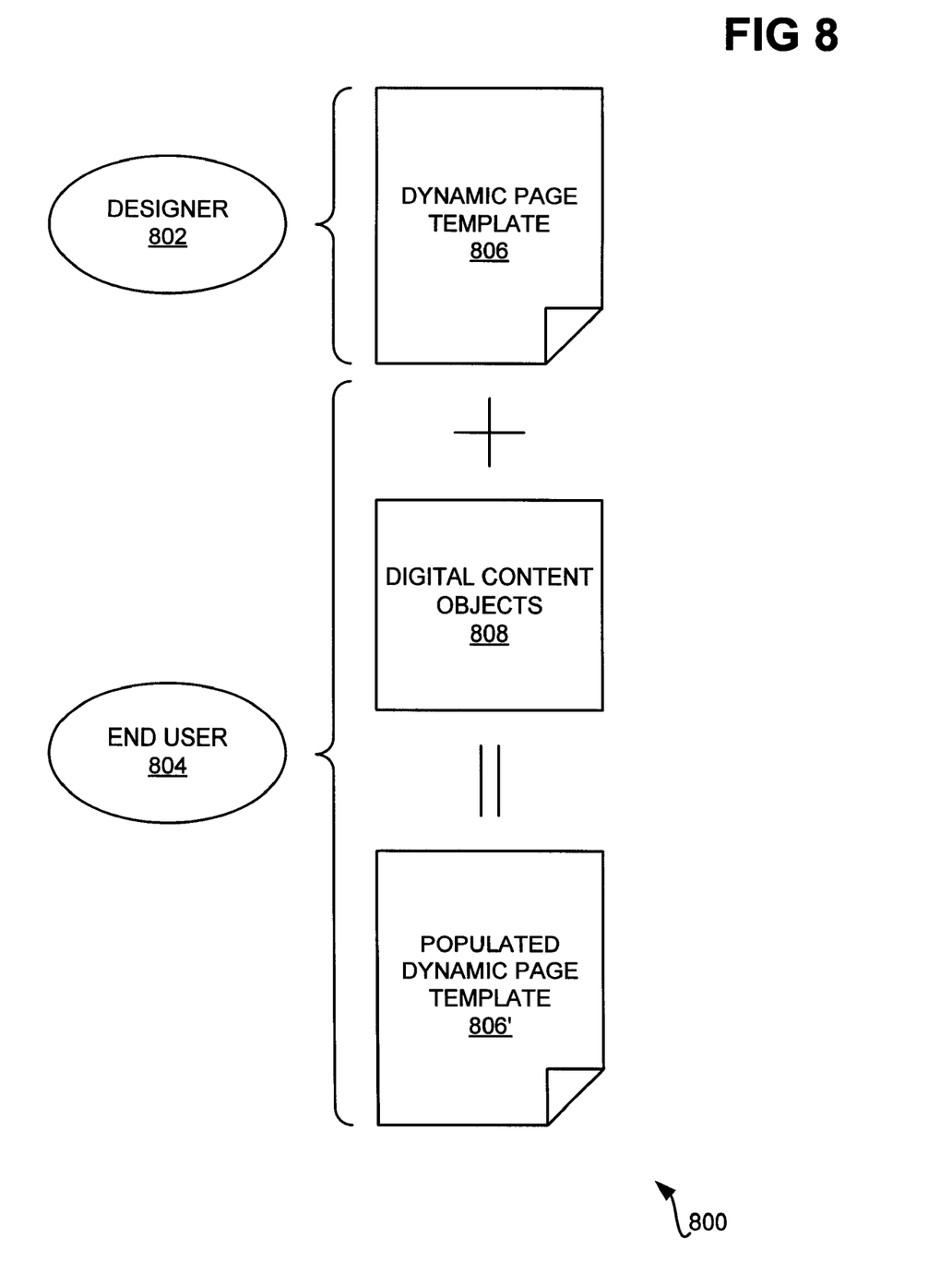
FIG. 8 is a diagram of an environment including a designer and an end user, in which the method of FIG. 2 can be performed, according to an embodiment of the present disclosure.

FIG. 8 shows an environment 800 in which the method 200 can be practiced, according to an embodiment of the present disclosure. There are at least two users involved within the environment 800: a designer 802 and an end user 804. The designer 802 defines or specifies a dynamic page template 806, by interacting with a computer program at least partially implementing the method 200. Thereafter, the end user 804 interacts with the same or different computer program also at least partially implementing the method 200, to select digital content objects 808, and populate the dynamic page template 806 with the digital content objects 808, in accordance with the definition or specification of the template 806 provided by the designer 802. This results in the populated dynamic page template 806' having the digital content objects 808 placed thereon. It is noted that in some embodiments, the designer and the user can be the same individual, however.

Thus, the designer 802 provides the initial rules and parameters governing how the dynamic page template 806 has the digital content objects 808 placed thereon. However, the designer 802 does not specify the sizes, shapes, and/or number of these digital content objects 808. Rather, based on the rules and parameters defining the dynamic page template 806, subsequent utilization of the dynamic page template 806 by the end user 804 in selecting the digital content objects 808 results in these objects 808 being dynamically placed on the template 806.

In this way, the designer 802 is saved from the tedious task of having to create a large number of static page templates all based on the same theme, but which differently specify the sizes, shapes, and/or number of digital content objects that can be placed on each such template. Rather, the designer 802 generally specifies how the dynamic page template 806 will place digital content objects thereon, and thus defines just one dynamic page template 806. Based on given sizes, shapes, and/or number of the digital content objects 808 that the end user selects for placement on the dynamic page template 806, the resulting populated dynamic page template 806' can look quite different, but still adhere to the same general theme that the designer 802 encapsulated within the dynamic page template 806.

Figure 9:
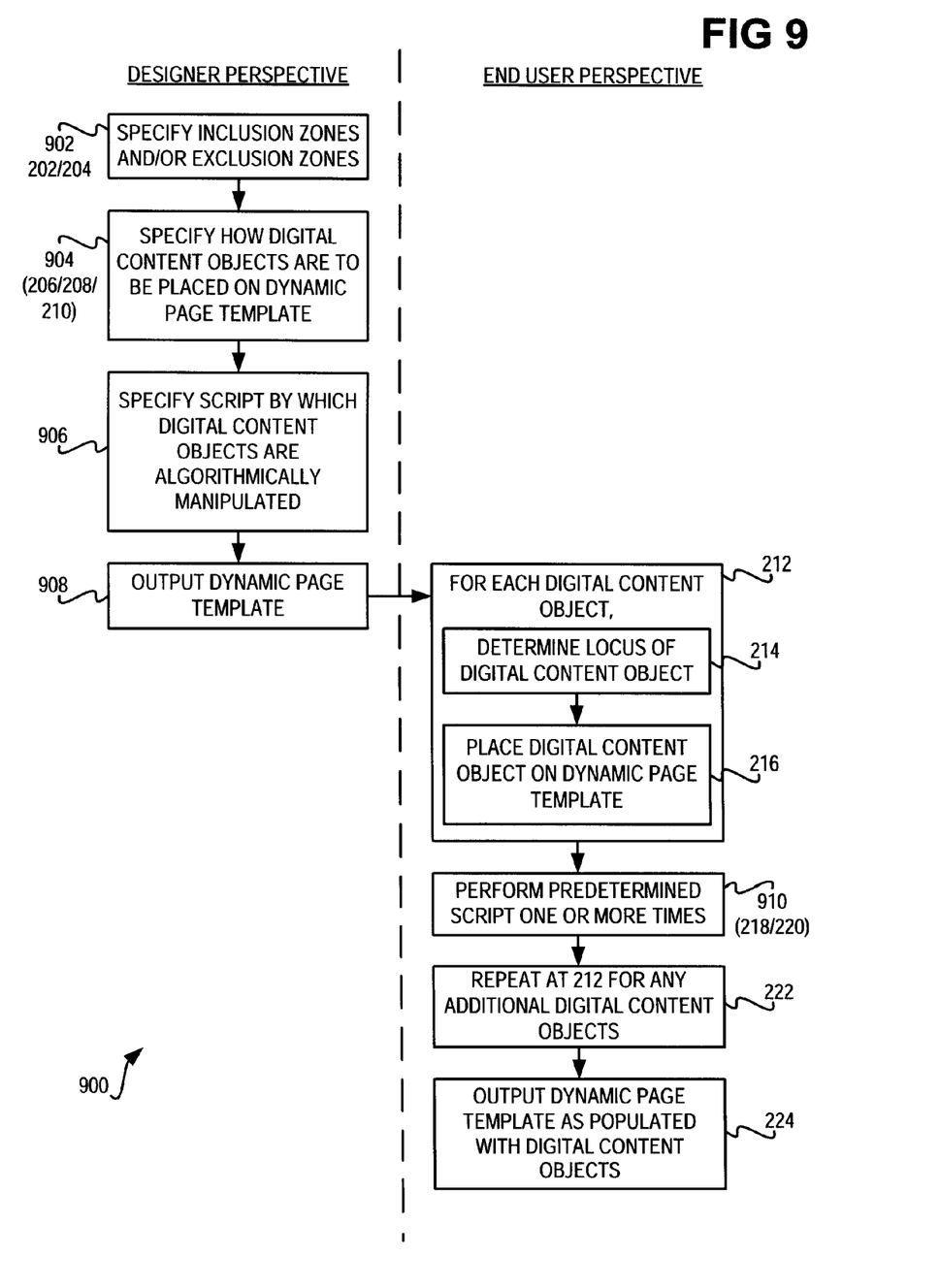
FIG. 9 is a flowchart of an exemplary adaptation of the method of FIG. 2 to the environment of FIG. 8, according to an embodiment of the present disclosure.

In conclusion, FIG. 9 shows a method 900 that more explicitly delineates the performance of the method 200 in relation to the environment 800 of FIG. 8, according to an embodiment of the present disclosure. The parts of the method 900 to the left of the dotted line are performed from the perspective of the designer, and the parts of the method 900 to the right of the dotted line are performed from the perspective of the end user. The method 900, as with the method 200, may at least substantially be implemented as one or more computer programs stored on a computer-readable medium, and executed by one or more processors of one or more computing devices.

The designer thus specifies one or more inclusion zones and/or one or more exclusion zones within the dynamic page template (902), as has been described in relation to parts 202 and 204 of the method 200. The designer specifies how digital content objects are generally to be placed on the dynamic page template (904). For instance, the designer may specify anchor points, magnetic points, and grid lines as has been described in relation to parts 206, 208, and 210 of the method 200. The designer may also specify a predetermined orientation and a predetermined direction in which digital content objects are placed on the dynamic page template, as has been exemplarily described in relation to FIG. 6.

The designer may specify a predetermined script by which digital content objects are algorithmically manipulated in size and/or location after they have been placed on the dynamic page template (906). An example of such a predetermined script has been exemplarily described in relation to FIGS. 7A and 7B. Thereafter, once the designer is finished defining the dynamic page template, the dynamic page template is output (908). For instance, the dynamic page template may be saved for subsequent utilization by the end user so that the end user can populate the dynamic page template with desired digital content objects.

Thus, for each of one or more digital content objects selected by the end user (212), the locus of the digital content object is determined (214), and the digital content object is placed on the dynamic page template (216). Each digital content object is placed at one of the locations specified by the locus, in accordance with one or more constraints specified a priori by the dynamic page template itself, as defined by the designer. These constraints do not limit the number, sizes, and/or shapes of the digital content objects, however. Rather, the constraints include the exclusion and/or inclusion zones, the predetermined direction and orientation, the anchor points, the magnetic points, and/or the grid lines specified within the dynamic page template as defined by the designer.

The predetermined script specified within the dynamic page template is performed one or more times (910), to manipulate the digital content objects that have been placed on the dynamic page template by size and/or by location, as has been described in relation to parts 218 and 220 of the method 200. The method 900 may be repeated at part 212 for any digital content objects (222). Finally, the dynamic page template, as populated with the digital content objects, is output (224).

I claim:

1. A method for populating a dynamic page template with one or more digital content objects, comprising:
   for each digital content object;
      determining a locus of the digital content object in relation to the dynamic page template, the locus specifying locations on the dynamic page template at which the digital content object can be placed; and
      placing the digital content object on the dynamic page template at one of the locations specified by the locus in accordance with one or more constraints specified a priori by the dynamic page template, where the constraints do not limit a number of the digital content objects that can be placed on the digital page template;
   repeating one or more times:
      algorithmically manipulating, as specified a priori by the dynamic page template, the digital content objects placed on the dynamic page template to one or more of:
         change sizes of one or more of the digital content objects; and
         change locations of one or more of the digital content objects; and,
   outputting the dynamic page template on which the digital content objects have been placed.

2. The method of claim 1, wherein the dynamic page template does not a priori constrain sizes or shapes of the digital content objects.

3. The method of claim 1, wherein determining the locus of the digital content object comprises determining the locus of the digital content object so that the digital content object does not overlap any other digital content objects already placed on the dynamic page template.

4. The method of claim 1, wherein placing the digital content object on the dynamic page template at one of the location specified by the locus comprises placing the digital content object on the dynamic page template in accordance with a predetermined direction and a predetermined orientation.

5. The method of claim 1, wherein algorithmically manipulating the digital content objects placed on the dynamic page template comprises executing a predetermined script as to how the digital content objects placed on the dynamic page template are to be manipulated by size and/or by location.

6. The method of claim 1, further comprising repeating the method in relation to one or more additional digital content objects to be added to the dynamic page template.

7. The method of claim 1, further comprising:
   specifying one or more inclusion zones within the dynamic page template, each inclusion zone encompassing locations on the dynamic page template at which the digital content objects can be placed,
   wherein determining the locus of the digital content object takes into account the inclusion zones.

8. The method of claim 1, further comprising:
   specifying one or more exclusion zones within the dynamic page template, each exclusion zone encompassing locations on the dynamic page template at which the digital content objects cannot be placed,
   wherein determining the locus of the digital content object takes into account the exclusion zones.

9. The method of claim 1, further comprising one or more of:
   specifying one or more anchor points within the dynamic page template, the digital content objects successively placed on the dynamic page template at the anchor points until all the anchor points have been used;
   specifying one or more magnetic points within the dynamic page template, the digital content objects successively placed on the dynamic page template such that the digital content objects are clustered around the magnetic points; and,
   specifying one or more grid lines within the dynamic page template, the digital content objects successively placed on the dynamic page template along the grid lines.

10. A computer-readable medium having one or more computer programs stored thereon to perform a method for generating a dynamic page template to which one or more digital content objects are to be added, comprising:
    performing one or more of:
       specifying one or more inclusion zones within the dynamic page template, each inclusion zone encompassing locations on the dynamic page template at which the digital content objects can be placed; and
       specifying one or more exclusion zones within the dynamic page template, each exclusion zone encompassing locations on the dynamic page template at which the digital content objects cannot be placed;
    specifying how the digital content objects are to be placed on the dynamic page template, without constraining a number of the digital content objects to be placed on the dynamic page template;
    specifying a predetermined script as to how the digital content objects are to be manipulated by size and/or by location after the digital content objects have been placed on the dynamic page template; and,
    outputting the dynamic page template for utilization by a user to populate the dynamic page template with the digital content objects.

11. The computer-readable medium of claim 10, wherein specifying how the digital content objects are to be placed on the dynamic page template comprises specifying a predetermined direction and a predetermined orientation in accordance with which the digital content objects are to be placed on the dynamic page template.

12. The computer-readable medium of claim 10, wherein specifying how the digital content objects are to be placed on the dynamic page template comprises specifying one or more anchor points within the dynamic page template such that the digital content objects are to be successively placed on the dynamic page template at the anchor points until all the anchor points have been used.

13. The computer-readable medium of claim 10, wherein specifying how the digital content objects are to be placed on the dynamic page template comprises specifying one or more magnetic points within the dynamic page template such that the digital content objects are to be successively placed on the dynamic page template such that the digital content objects are clustered around the magnetic points.

14. The computer-readable medium of claim 10, wherein specifying how the digital content objects are to be placed on the dynamic page template comprises specifying one or more grid lines within the dynamic page template such that the digital content objects are to be successively placed on the dynamic page template along the grid lines.

15. A computer-readable medium having one or more computer programs stored thereon to perform a method for adding one or more digital content objects to a dynamic page template that has been previously generated, comprising,
    for each digital content object:
       determining a locus of the digital content object in relation to the dynamic page template, the locus specifying locations on the page template at which the digital content object can be placed; and placing the digital content object on the dynamic page template at one of the locations specified by the locus in accordance with one or more constraints specified a priori by the dynamic page template, where the constraints do not limit a number of the digital content objects that can be placed on the digital page template;

performing a predetermined script specified a priori by the dynamic page template to manipulate how the digital content objects have been placed on the dynamic page template, by size and/or by location; and, outputting the dynamic page template to which the digital content objects have been placed;

wherein the constraints comprise one or more of:

a predetermined direction and a predetermined orientation, in accordance with which the digital content object is to be placed on the dynamic page template;

one or more inclusion zones, each inclusion zone specifying locations on the dynamic page template at which the digital content objects can be placed;

one or more exclusion zones, each exclusion zone specifying locations on the dynamic page template at which the digital content objects cannot be placed;

one or more anchor points, such that the digital content objects are successively placed on the dynamic page template at the anchor points until all the anchor points have been used;

one or more magnetic points, such that the digital content objects are successively placed on the dynamic page template such that the digital content objects are clustered around the magnetic points; and, one or more grid lines, such that the digital content objects are successively placed on the dynamic page template along the grid lines.

* * * * *

UNITED STATES PATENT AND TRADEMARK OFFICE
CERTIFICATE OF CORRECTION

| | | |
|---|---|---|
| PATENT NO. | : 8,042,039 B2 | Page 1 of 1 |
| APPLICATION NO. | : 12/253150 | |
| DATED | : October 18, 2011 | |
| INVENTOR(S) | : Dean A. Anderson | |

It is certified that error appears in the above-identified patent and that said Letters Patent is hereby corrected as shown below:

In column 9, line 4, in Claim 1, delete "object;" and insert -- object: --, therefor.

Signed and Sealed this
Nineteenth Day of June, 2012

David J. Kappos
*Director of the United States Patent and Trademark Office*